(12) United States Patent
Beranek et al.

(10) Patent No.: US 7,387,338 B2
(45) Date of Patent: *Jun. 17, 2008

(54) AUTOMOTIVE MULTI-POSITION SEAT ASSEMBLY

(75) Inventors: John Beranek, Ann Arbor, MI (US); David Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/275,469

(22) Filed: Jan. 6, 2006

(65) Prior Publication Data

US 2006/0152056 A1 Jul. 13, 2006

Related U.S. Application Data

(63) Continuation-in-part of application No. 11/031,892, filed on Jan. 7, 2005, now Pat. No. 7,125,076.

(51) Int. Cl.
*B60N 2/02* (2006.01)
(52) U.S. Cl. ............... 297/283.3; 297/383; 297/362.11
(58) Field of Classification Search ............. 297/283.3, 297/283.1, 383, 92, 94, 354.1, 452.18, 362.11
See application file for complete search history.

(56) References Cited

U.S. PATENT DOCUMENTS

| 629,258 | A | 7/1899 | Johnston |
| 923,197 | A | 6/1909 | Murchison |
| 1,096,678 | A | 5/1914 | Budd |
| 1,443,479 | A | 1/1923 | Lambert |
| 3,165,350 | A | 1/1965 | Willson |
| 3,531,552 | A | 9/1970 | Getz et al. |
| 4,168,860 | A | 9/1979 | Garza et al. |
| 4,407,542 | A | 10/1983 | Kehl et al. |
| 4,487,452 | A | 12/1984 | Tanizaki et al. |
| 4,655,503 | A | 4/1987 | Kamijo et al. |
| 4,685,719 | A | 8/1987 | Hanemaayer |
| 4,779,917 | A | 10/1988 | Campbell et al. |
| 4,792,188 | A | 12/1988 | Kawashima |
| 5,000,505 | A | 3/1991 | Kawashita et al. |
| 5,046,433 | A | 9/1991 | Kramer et al. |
| 5,149,171 | A | 9/1992 | Gilevich et al. |

(Continued)

FOREIGN PATENT DOCUMENTS

WO WO 0214103 A1 2/2002

OTHER PUBLICATIONS

Magna-Intier Seat, Jun. 8, 2004.

*Primary Examiner*—Milton Nelson, Jr.
(74) *Attorney, Agent, or Firm*—Gregory Brown; Brooks Kushman P.C.

(57) ABSTRACT

A seat assembly is disclosed for a passenger vehicle which provides multiple positions by translating a seat back between a fore position and an aft position relative to the seat bottom. A carriage is disclosed mounted to a track within a seat bottom for translating the seat back to the fore and aft positions. A motor and transmission are disclosed for driving the carriage. Additionally, a mechanism is disclosed for adjusting the tilt angle of the seat back as it is translated. A method for adjusting a seat assembly is provided.

20 Claims, 13 Drawing Sheets

U.S. PATENT DOCUMENTS

| | | |
|---|---|---|
| 5,197,774 A | 3/1993 | Diaz |
| 5,322,341 A | 6/1994 | Harrison et al. |
| 5,451,009 A | 9/1995 | Rumpf |
| 5,482,354 A | 1/1996 | Gryp |
| 5,524,962 A | 6/1996 | Fulgenzi et al. |
| 5,639,141 A | 6/1997 | Hanemaayer |
| 5,947,541 A | 9/1999 | Behrens et al. |
| 5,967,608 A | 10/1999 | Van Sickle |
| 6,000,742 A | 12/1999 | Schaefer et al. |
| D419,520 S | 1/2000 | Bergh |
| 6,065,798 A | 5/2000 | Sankrithi |
| 6,079,773 A | 6/2000 | Hassan |
| D430,534 S | 9/2000 | Golenz |
| 6,126,218 A | 10/2000 | Karhumaki |
| 6,129,404 A | 10/2000 | Mattarella et al. |
| 6,168,234 B1 | 1/2001 | Haynes et al. |
| 6,199,945 B1 | 3/2001 | Kim |
| 6,315,352 B1 | 11/2001 | Nomura |
| 6,402,246 B1 | 6/2002 | Mundell |
| 6,439,443 B1 | 8/2002 | Liao |
| 6,457,694 B1 | 10/2002 | Haynes et al. |
| 6,471,297 B1 | 10/2002 | Runde et al. |
| 6,474,739 B1 | 11/2002 | Lagerweij |
| 6,474,741 B2 | 11/2002 | Kamida et al. |
| 6,488,333 B2 | 12/2002 | Kim |
| 6,494,531 B1 | 12/2002 | Kim |
| 6,575,420 B2 | 6/2003 | Yoshida et al. |
| 6,715,825 B2 | 4/2004 | Tame |
| 2005/0253433 A1 | 11/2005 | Brown et al. |

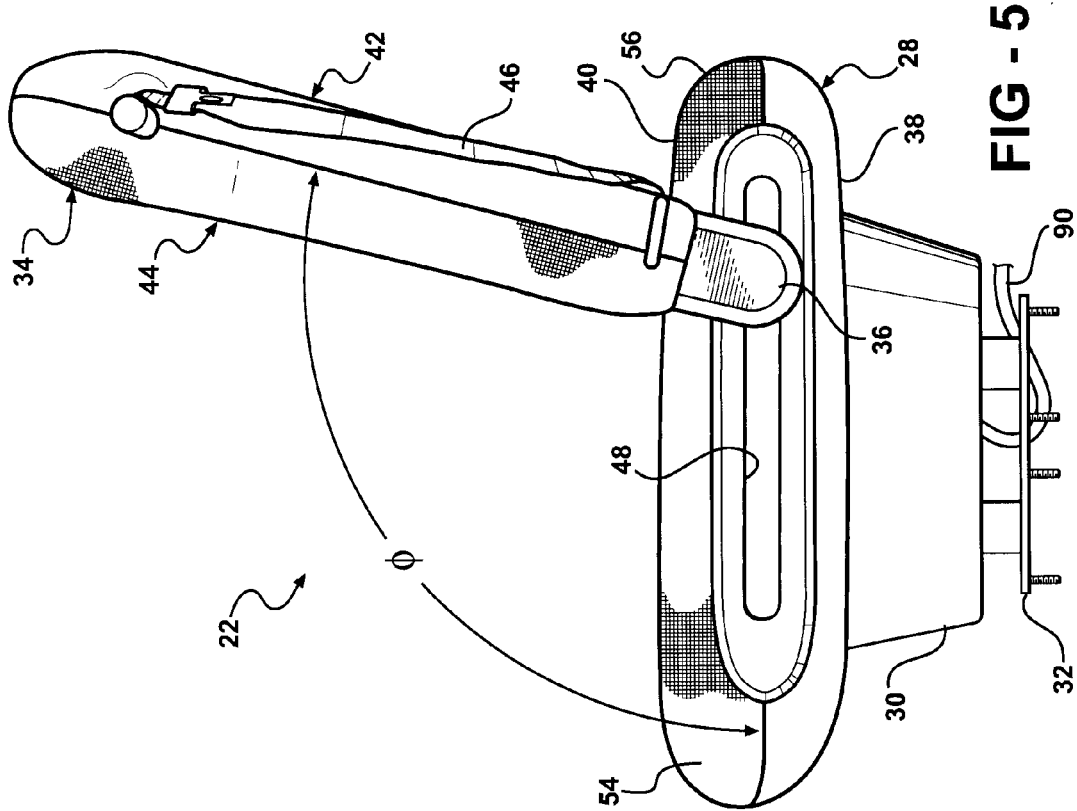
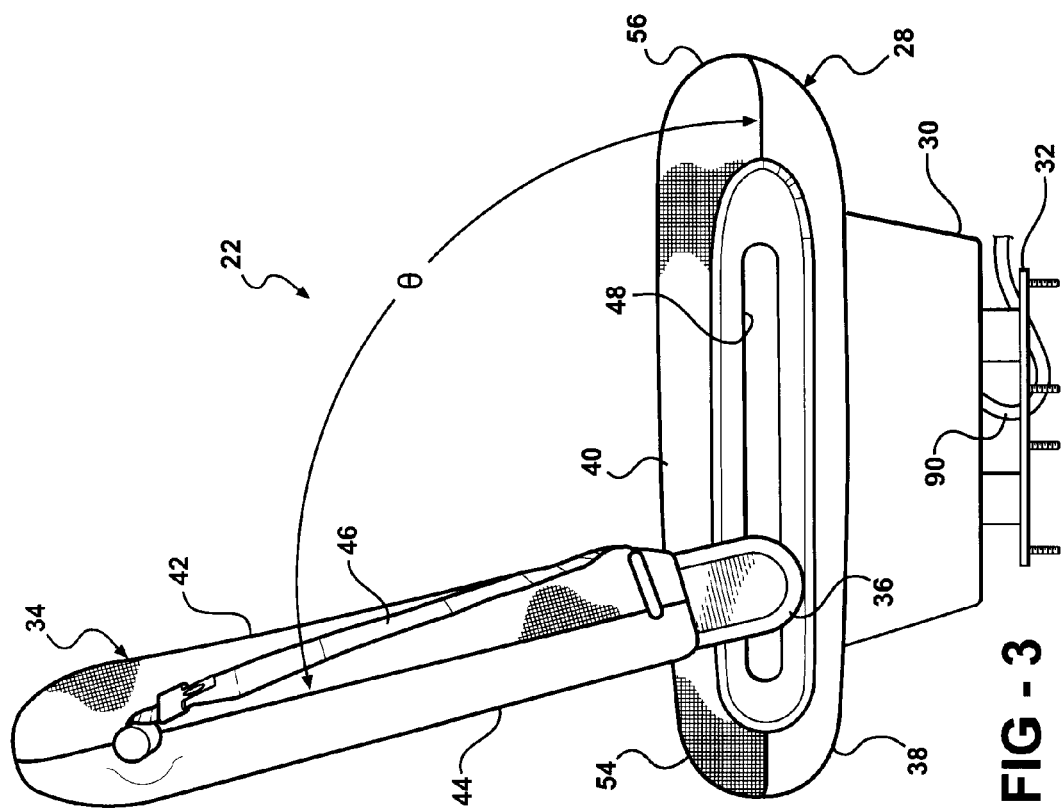

AUTOMOTIVE MULTI-POSITION SEAT ASSEMBLY

CROSS-REFERENCE TO RELATED APPLICATIONS

This application is a continuation-in-part of U.S. application Ser. No. 11/031,892 filed Jan. 7, 2005, now U.S. Pat. No. 7,125,076 issued Oct. 24, 2006.

BACKGROUND OF THE INVENTION

1. Field of the Invention

The present invention relates to automotive seat assemblies, more particularly to adjustable automotive seat assemblies.

2. Background Art

Automotive seating assemblies are continuously advancing. The market for motor vehicles, particularly passenger vehicles, has expressed an interest for passenger vehicles that optimize comfort, flexibility and features within a vehicle's interior.

In the advent of increased popularity of passenger/cargo vehicles such as SUVs or minivans, flexibility in seating, seating arrangements, seat adjustments and the like are well received by the consumer market. Accordingly, automotive manufacturers have incorporated various flexible features, such as collapsible seats, foldable seats, removable seats and the like so that the passenger may arrange the seats in a desired fashion.

Due to advances in modern electronics, many electronics that were conventionally associated with audio/video equipment for home or personal use, have eventually made their way into vehicle interiors. Such electronics include televisions, video game systems or the like.

Advances in electronic technology have permitted utilization of exterior mounted cameras for receiving external images, which are subsequently displayed within the vehicle. Such displays assist, for example, in backing up, or driving in reverse, particularly in larger vehicles such as large sedans, sport utility vehicles (SUVs), minivans, or the like.

In view of the foregoing, a flexible seat assembly is needed, that provides multiple seating positions. Also a method for adjusting a seat assembly to multiple positions is needed.

SUMMARY OF THE INVENTION

An aspect of the present invention is to provide a seat assembly for a passenger vehicle. The seat assembly has a seat bottom frame adapted to be mounted to a floor of the passenger vehicle. The frame has a forward end and a rearward end. A seat bottom cushion is provided mounted to the seat bottom frame for receiving a passenger. A track is mounted to the seat bottom frame extending generally from the forward end to the rearward end. A carriage is mounted to the track for translation along the track. A seat back is mounted to the carriage for translation with the carriage between a fore position and an aft position thereby providing at least two seating positions upon the seat assembly. A motor is provided on one of the seat bottom frame and the carriage. A transmission is driven by the motor and operably engaged to the seat bottom frame and the carriage for driving the carriage along the track to the fore and aft positions. The transmission is operably engaged to the seat back for adjusting a tilt orientation of the seat back relative to the seat bottom.

Another aspect of the present invention is to provide a seat assembly for a passenger vehicle with a seat bottom frame adapted to be mounted to a floor of the passenger vehicle. The frame has a forward end and a rearward end, with a seat bottom cushion mounted to the frame for receiving a passenger thereon. A track is mounted to the seat bottom frame extending generally from the forward end to the rearward end. A carriage is operably mounted to the track for translation along the track. A harmonic gear mechanism is mounted to the carriage. A seat back is mounted to the carriage in operable engagement with the harmonic gear mechanism for translation with the carriage between a fore position and aft position for providing at least two seating positions upon the seat assembly. A transmission is operably engaged to the seat bottom frame and the carriage, whereby upon receipt of a rotary input, the transmission drives the carriage along the track to the fore and aft positions. The transmission is operably engaged to the harmonic gear mechanism for adjusting a tilt orientation of the seat back relative to the seat bottom.

The above aspects, objects, embodiments, benefits and advantages are apparent in the attached figures and in the detailed description of embodiments of the invention below.

BRIEF DESCRIPTION OF THE DRAWINGS

FIG. 3 is a side elevation view of the seat assembly of FIG. 1, illustrated in the first position;

FIG. 5 is a side elevation view of the seat assembly of FIG. 1, illustrated in the second position;

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
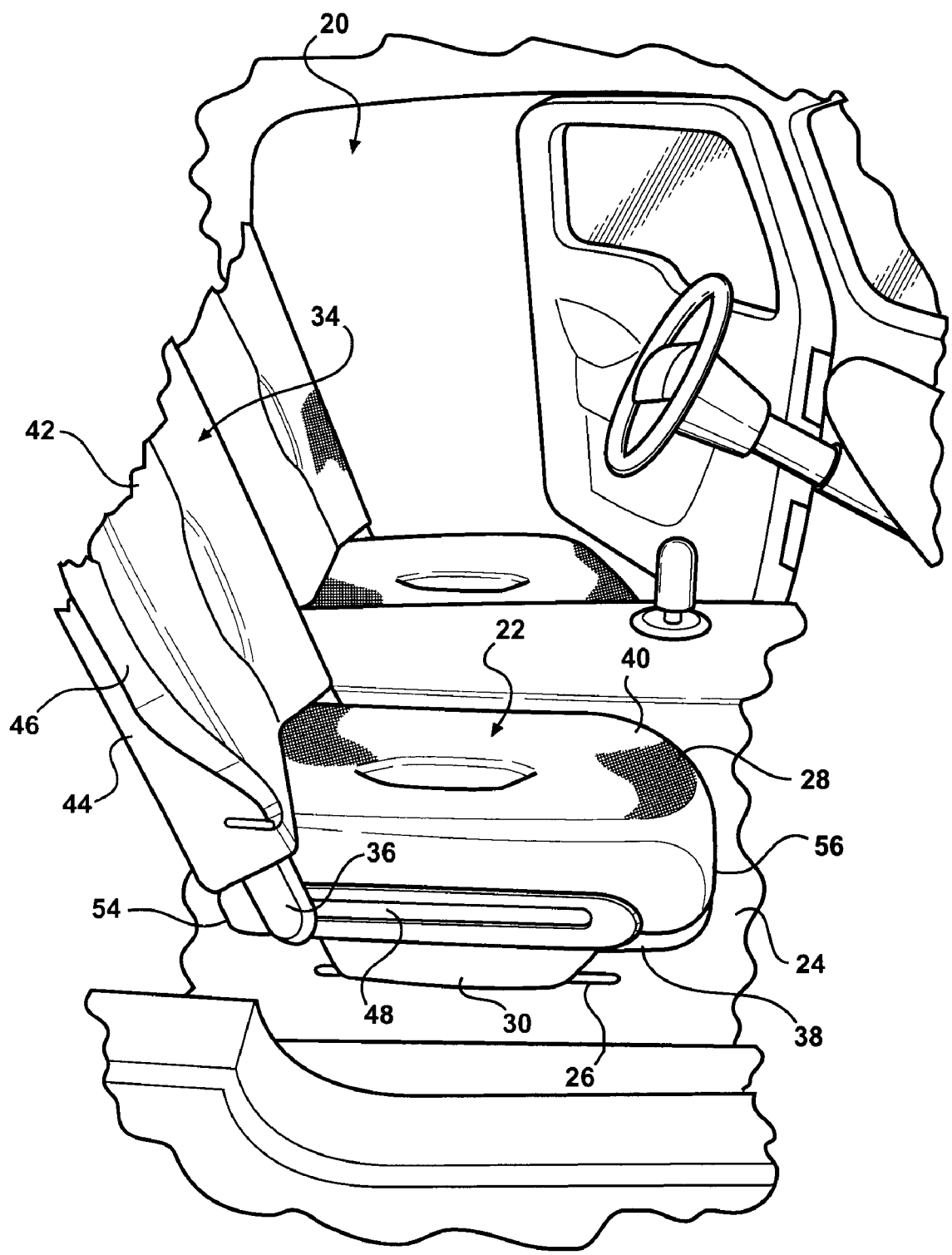
FIG. 1 is a passenger-side perspective view of an automotive interior, in accordance with the present invention, illustrating a seat assembly in a first position.

With reference now to FIG. 1, an automotive vehicle interior 20 is illustrated, specifically the interior of an SUV. The invention contemplates, however, any automotive interior within the spirit and scope of the present invention. The automotive interior 20 includes a first row of seat assemblies 22 each mounted to a vehicle floor 24. Each seat assembly 22 may be mounted to a track 26 in the vehicle floor 24 for longitudinal displacement of the seat assembly 22 relative to the vehicle.

Figure 2:
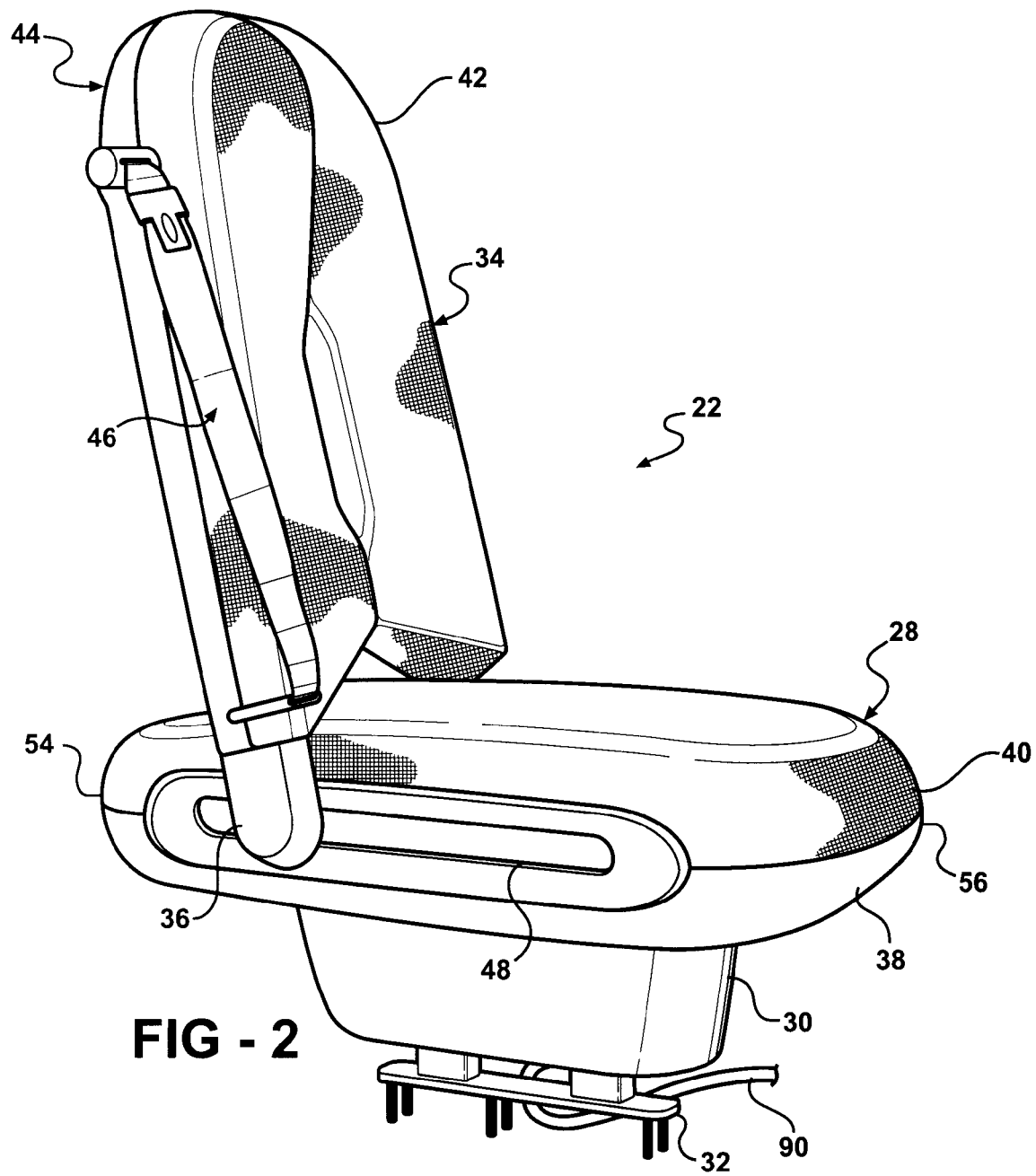
FIG. 2 is a perspective view of the seat assembly of FIG. 1, illustrated in the first position.

Referring now to FIGS. 2 and 3, the seat assembly 22 is illustrated in a first seating position corresponding to that illustrated in FIG. 1, wherein the passenger faces a forward direction of the vehicle.

The seat assembly 22 includes a seat bottom 28. The seat bottom 28 is supported upon a riser 30 for spacing the seat bottom 28 from the vehicle floor 24. The seat assembly 22 also includes a mounting bracket 32 for mounting the seat assembly 22 to the vehicle floor 24. The mounting bracket 32 may cooperate with the track 26 for translating the seat assembly 22 relative to the automotive interior 20.

The seat assembly 22 also includes a seat back 34 that is mounted to the seat bottom 28. The seat back 34 includes a pair of brackets 36, 36' that each extend to a lateral side of the seat bottom 28 for engagement therewith. The seat brackets 36, 36' support the seat back 34 relative to the seat bottom 28.

The seat bottom 28 includes a seat bottom frame 38 with a seat bottom cushion 40 provided thereupon. When the passenger sits on the seat assembly 22 in the forward facing direction of FIGS. 1-3, the user is seated upon the seat bottom cushion 40 and the passenger rests its back against the seat back 34. The seat back 34 is padded on a forward facing side 42 and a rearward facing side 44 for providing comfort and support to the passenger in multiple positions thereof. The seat back 34 also includes a seat belt assembly 46 for securing the passenger to the seat assembly 22 in the forward facing direction.

The seat bottom 28 includes a pair of slots 48, 48' formed through its lateral sides. The seat back 34 cooperates with a track provided within the seat bottom frame 38 through the slots 48, 48' formed in the sides of the seat bottom 28.

In the forward facing direction of the seat assembly 22, the seat back 34 is oriented at a rearward or aft position relative to the seat bottom 28 and is angled having a seat back tilt for comfortably supporting the passenger. The seat back tilt is generally provided at an included angle as an obtuse angle provided between the seat back 34 and the seat bottom 28. This included angle is illustrated by $\theta$ in FIG. 3.

Figure 4:
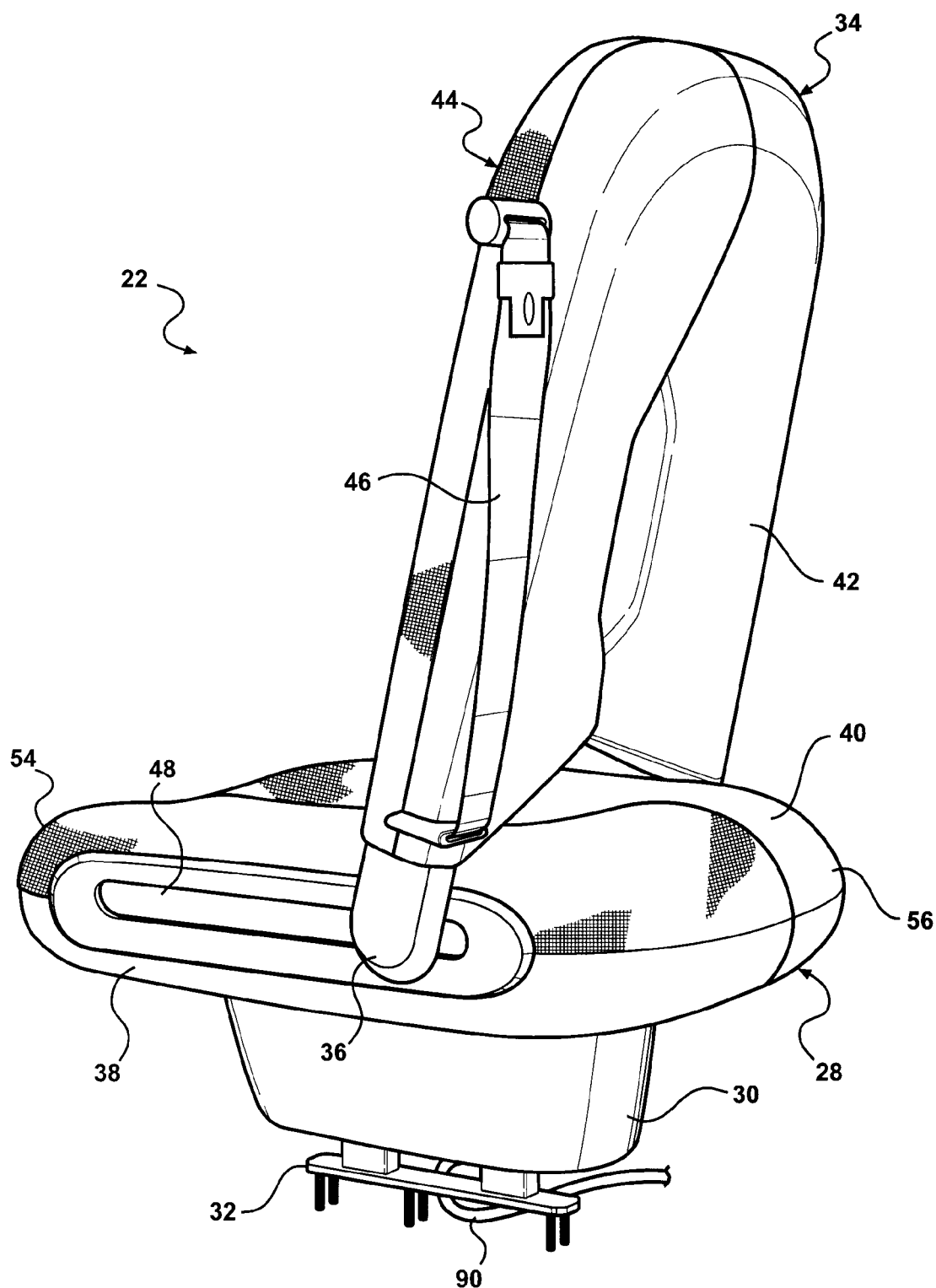
FIG. 4 is a side perspective view of the seat assembly of FIG. 1, illustrated in a second position.

Referring now to FIGS. 4 and 5, the seat back 34 has been translated to a forward position at a forward end of the seat bottom 28. At this orientation, the passenger may sit upon the seat bottom cushion 40 and face a rearward direction of the vehicle. The passenger may also rest its back against the cushioned rearward facing side 44 of the seat back 34. As illustrated in FIG. 5, when the seat back 34 has translated to the forward end of the seat bottom 28, the tilt of the seat back 34 is reversed thereby providing an included angle $\phi$ between the seat back 34 and the seat bottom 28 which is also inclined away from the seat bottom 28 forming an obtuse angle for comfortably receiving the passenger.

The rearward facing orientation of the seat assembly 22 in FIGS. 4 and 5 permits the passenger to sit on the seat assembly 22 and face the reverse direction, without having to rotate the seat assembly 22 or remove and reinstall the seat assembly 22. Such an orientation may be useful for communicating with others located in a second rearward seating row. Additionally, such a seating position may be effective for rearward viewing while traveling.

Figure 6:
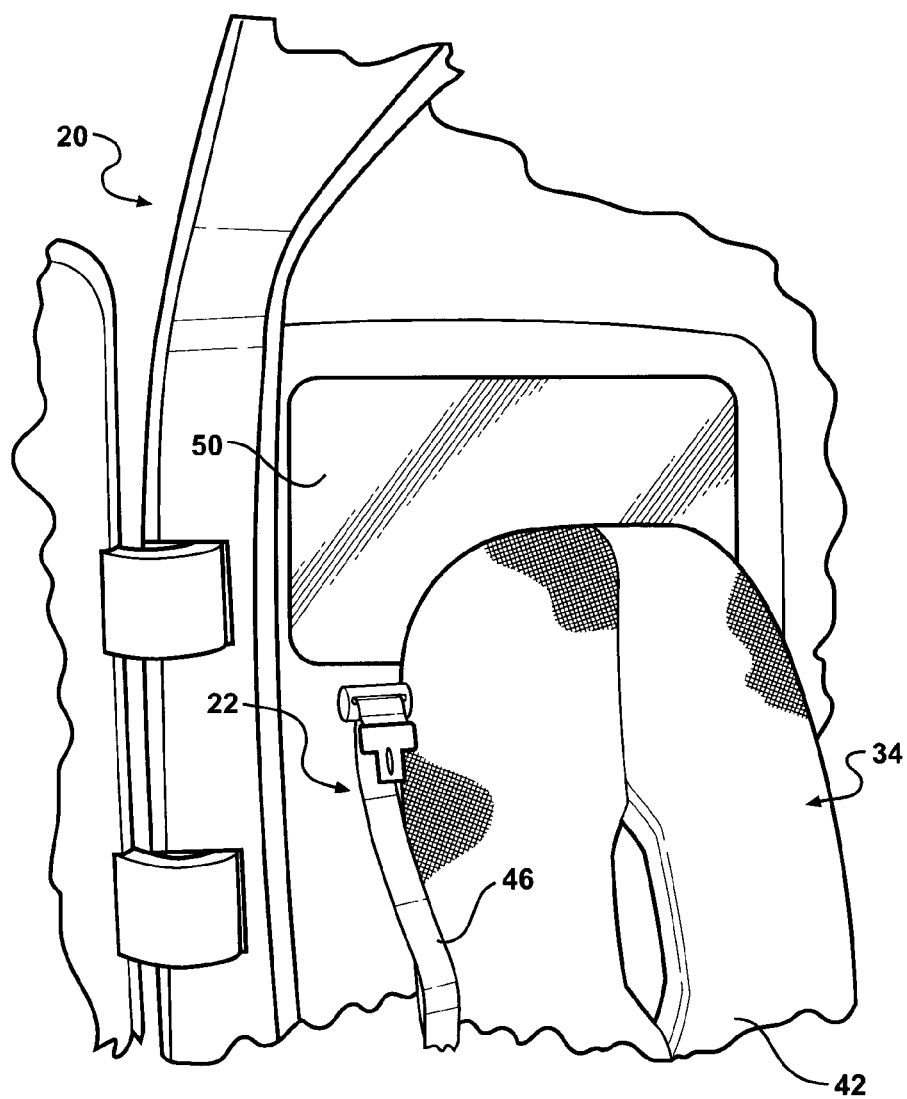
FIG. 6 is a front perspective view of the automotive interior of FIG. 1.

In one embodiment, as illustrated in FIG. 6, the automotive interior 20 may include a visual display such as a flat panel display 50 mounted upon a rearward door in the automotive interior 20. The flat panel display 50 may be provided in cooperation with a visual media input, such as a DVD player, television signals, computer displays, video game displays, or satellite television channels. Accordingly, a passenger may desire to face rearward and watch a broadcast provided on the flat panel display 50. The driver seat assembly 22 may also be capable of facing the rearward direction for viewing the flat panel display 50 when the vehicle is parked.

The vehicle may include an exterior camera for receiving an external image rearward of the vehicle, which may be displayed upon the flat panel display 50 during transportation of the vehicle. Such a display substitutes having a rear window for the driver to view an area rearward of the vehicle during travel.

Figure 7:
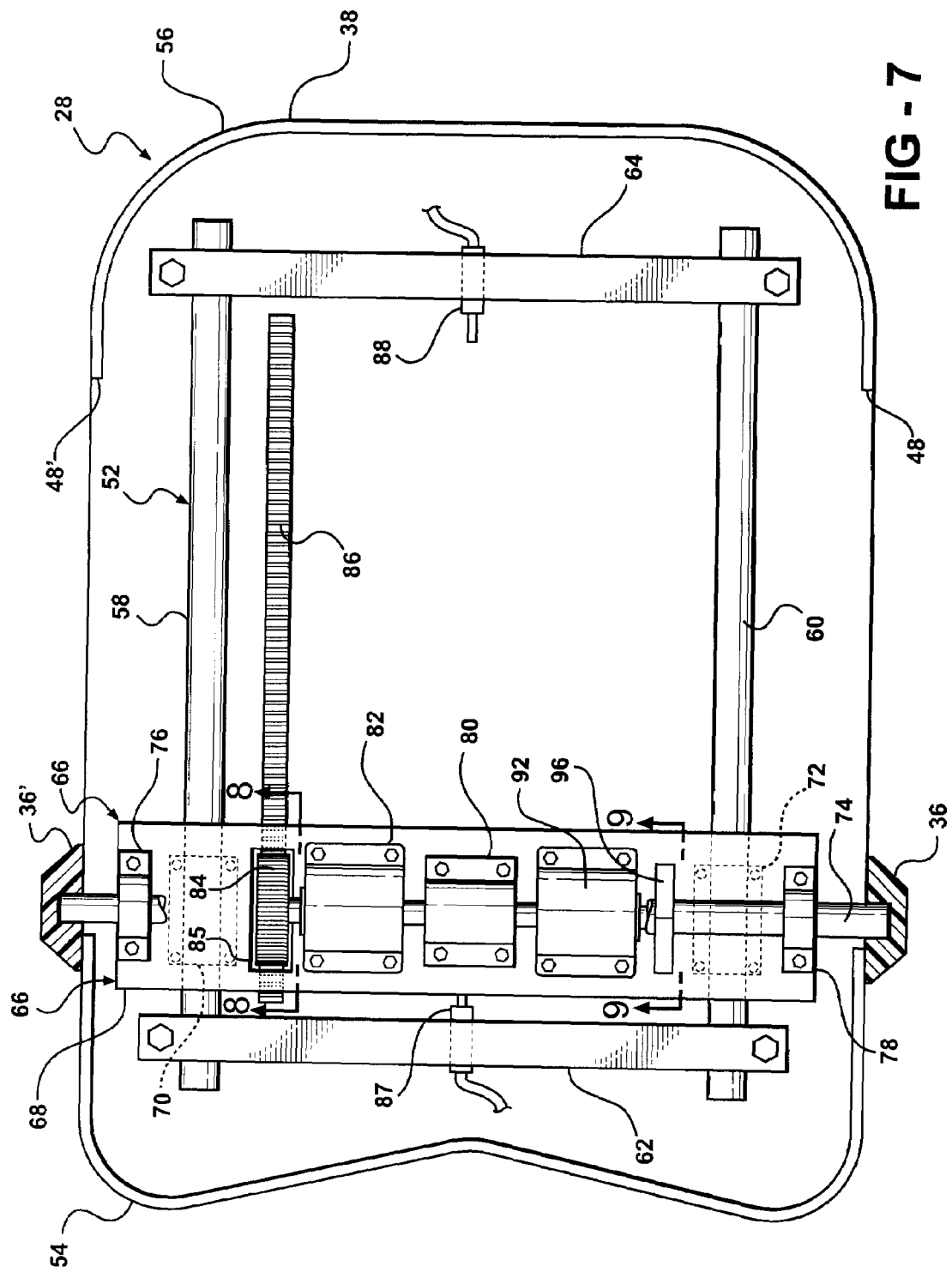
FIG. 7 is a fragmentary top plan view of the seat assembly of FIG. 1.

Referring now to FIG. 7, the seat bottom 28 is illustrated with the seat bottom cushion 40 removed, thus illustrating components mounted within the seat bottom frame 38. A linear track 52 is mounted to the seat bottom frame 38 and aligned longitudinally for translation of the seat back 34 between a rearward end 54 and a forward end 56 of the seat bottom 28. The track 52 includes a pair of linear guide shafts 58, 60 that are mounted to the seat bottom frame 38 by a pair of guide shaft mounting blocks 62, 64.

A carriage 66 is mounted to the track 52 for linear translation. The carriage 66 includes a carriage plate 68 with a pair of linear slide bearings 70, 72. The linear slide bearings 70, 72 are fastened to an underside of the carriage plate 68. Each slide bearing 70, 72 receives one of the guide shafts 58, 60 therethrough for providing bearing support to the carriage 66 as it translates along the guide shafts 58, 60.

The seat back brackets 36, 36' are mounted to distal ends of a transverse shaft 74, which extends through slots 48, 48' formed through the seat bottom 28. The transverse shaft 74 is mounted to the carriage plate 68 by a pair of rotary bearings 76, 78 for providing bearing support to the seat back 34 upon the carriage 66. The rotary bearings 76, 78 permit the seat back 34 to pivot relative to the seat bottom 28 as well. The transverse shaft 74 extends from one seat back bracket 36 to the other 36'. The transverse shaft 74 is illustrated partially fragmented in FIG. 7 to provide a view of the carriage 66 and its associated components displaced underneath the shaft 74. Of course, the invention contemplates a pair of transverse pivotal connections rather than the elongate transverse shaft 74.

The carriage 66 includes a motor 80 mounted to the carriage plate 68. The motor 80 drives a gear box 82 for imparting a reduced rotation to an output pinion gear 84 which extends through aperture 85 in carriage plate 68. The motor 80 may be a DC motor and the gear box 82 reduces the rotation of the motor 80 to provide a steady and gradual translation of the carriage 66.

Figure 8:
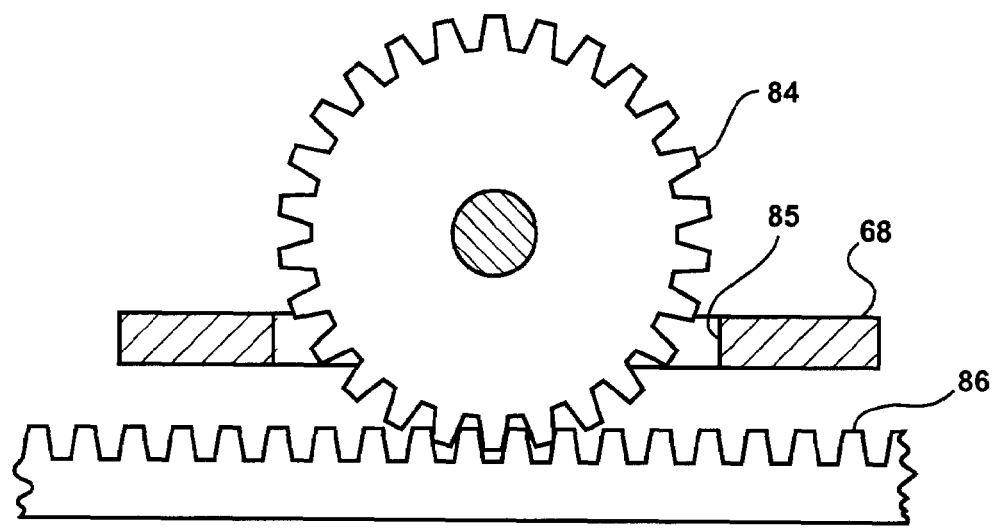
FIG. 8 is an enlarged section view taken along section line 8-8 in FIG. 7.

Referring now to FIGS. 7 and 8, the pinion gear 84 engages a gear rack 86 that is mounted to the seat bottom frame 38. Thus, the reduced rotation imparted to the pinion gear 84 drives the pinion gear 84 and consequently the carriage 66 along the rack 86.

Referring back to FIG. 7, although the motor 80 and gear box 82 are illustrated mounted to the carriage 66, the invention contemplates that the motor 80, gear box 82 and output could be mounted to the seat bottom frame 38, and the motor output could be utilized for engaging the carriage 66 and driving the carriage 66 along the track 52.

The motor 80 is utilized for driving the carriage 66 between the aft position as illustrated in FIG. 7, wherein the carriage 66 is mounted proximate to the seat bottom rearward end 54, and the fore position wherein the carriage 66 is translated proximate to the seat bottom forward end 38.

A pair of limit switches 87, 88 are provided mounted to the seat bottom frame 38. The limit switches 87, 88 are each mounted to one of the guide shaft blocks 62, 64 for engagement with the carriage 66 when it reaches either position in its range of translation. When the passenger desires to translate the seat back 34 from the aft position to the fore position, the passenger inputs a command within the vehicle interior 20 by, for example, pressing a button associated with the seat assembly 22. The input signal results in power imparted to the motor 80 which subsequently drives the gear box 82 and pinion gear 84 causing the carriage 66 to translate along the track 52. When the carriage 66 reaches the fore position, the carriage 66 engages the limit switch 88, which conveys a signal indicating that the carriage 66 has reached the fore position, and the power to the motor 80 is discontinued.

When the passenger inputs a signal to translate the carriage 66 from the fore position to the aft position, power is imparted to the motor 80 that generates a reverse rotation so that the carriage 66 translates in an opposite direction. Upon reaching the aft position, the limit switch 87 conveys a signal, which results in a termination of power imparted to the motor 80. The associated wiring for the motor 80 and limit switches 87, 88 is routed through a wire harness 90 that extends to the riser 30 as illustrated in FIGS. 2-5.

Although limit switches 87, 88 are illustrated and described, other position sensing devices may be employed within the spirit and scope of the present invention. For example, proximity sensors may be utilized for sensing the location of the carriage 66. A servo motor could be utilized for determining the position of the carriage 66. Alternatively, load sensors may be provided on the motor 80 for measuring an increased load imparted to the motor 80 characteristic of the carriage 66 reaching a limit in its travel.

The seat back 34 cooperates with the seat bottom 28 so that as the seat back is translated linearly, the tilt angle of the seat back is adjusted as well. For example, the motor 80 may have an output shaft extending from both ends for driving the first gear box 82 and a second gear box 92.

Figure 9:
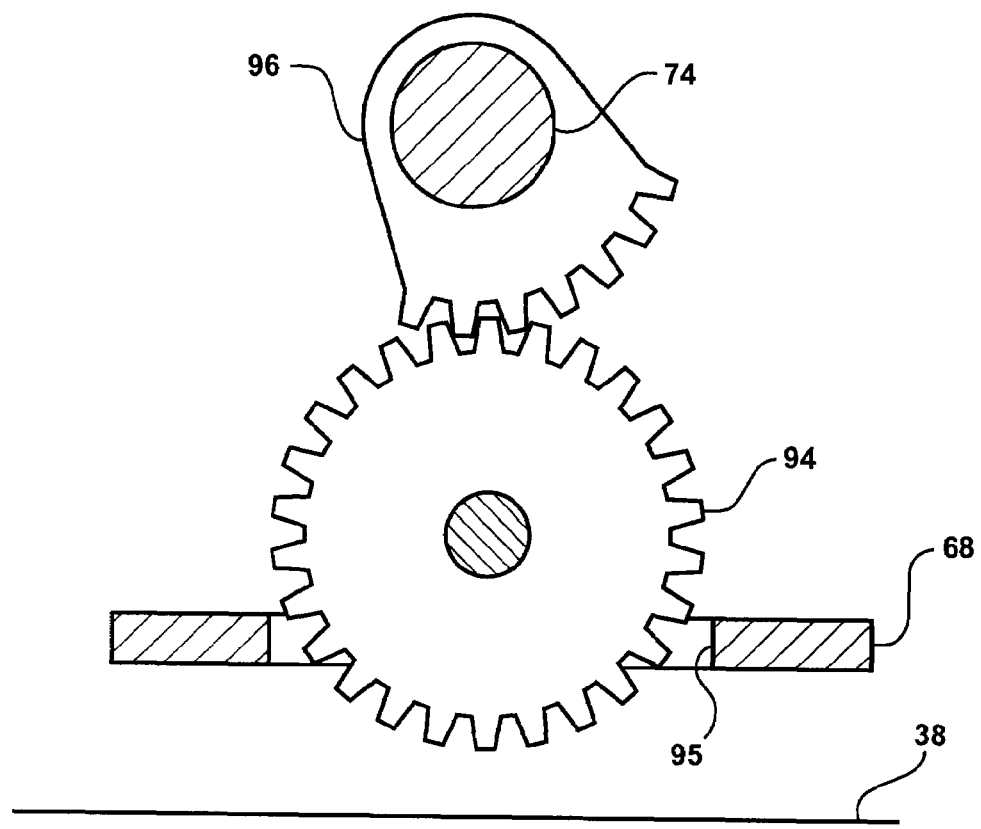
FIG. 9 is an enlarged section view taken along section line 9-9 in FIG. 7.

Referring now to FIGS. 7 and 9, the second gear box 92 drives an output pinion gear 94 which extends through aperture 95 in carriage plate 68. The second gear box 92 provides a reduced rotation that is reduced more than that provided by the first gear box 82. The pinion gear 94 is geared in engagement with a sector gear 96 that is mounted to the transverse shaft 74. Thus, as the motor 80 drives the carriage 66 along the track 52, the motor also drives the transverse shaft 74 for adjusting the tilt angle of the seat back 34. The output rotation of the second gear box 92 is reduced much greater than that of the first gear box 82 because only a partial rotation of the transverse shaft 74 is required.

Although a pair of gear boxes 82, 84 are illustrated on opposed output sides of the motor 80, the invention contemplates that the motor 80 may drive, in series, the first gear box 82, the pinion gear 84, and a subsequent reduction gear stage that drives the transverse shaft 74.

Figure 11:
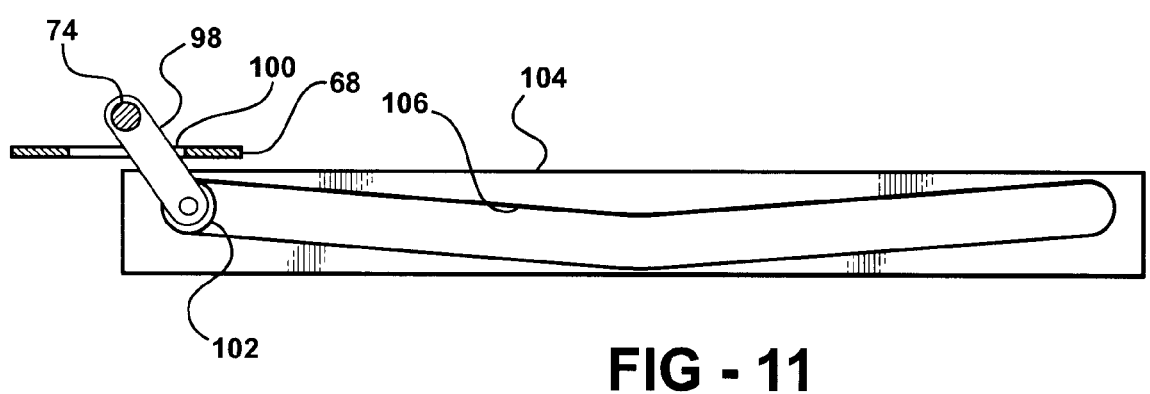
FIG. 11 is an enlarged section view taken along section line 11-11 in FIG. 10.
Figure 10:
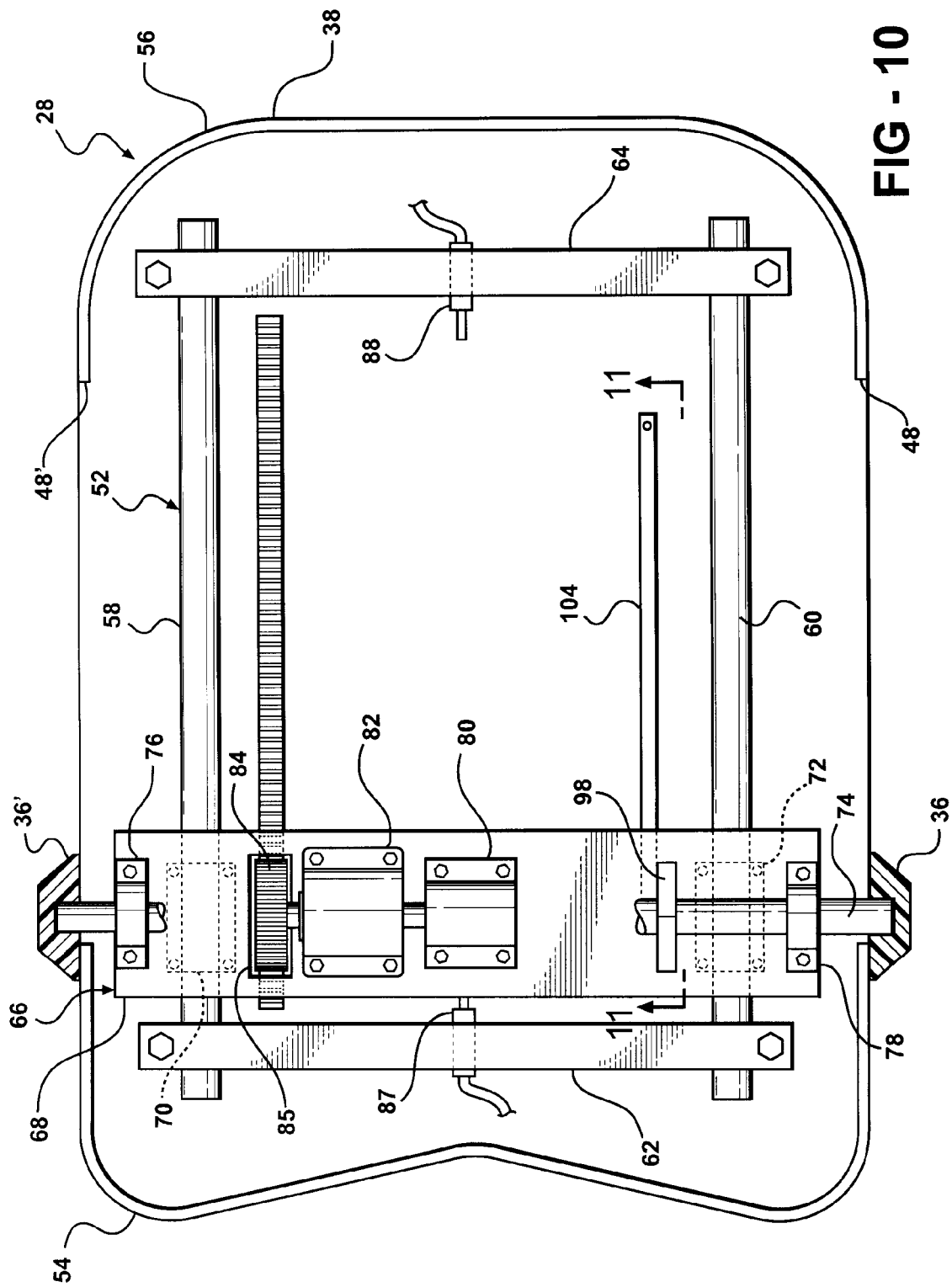
FIG. 10 is a fragmentary top plan view of an alternative embodiment seat assembly in accordance with the present invention.

Alternatively, with reference to FIGS. 10 and 11, an alternative tilt adjust mechanism is illustrated for tilting the seat back 34. Rather than a second transmission, the transverse shaft 74 includes a cam follower 98 extending therefrom through an aperture 100 formed in the carriage plate 68. A cam follower bearing 102 is mounted to a distal end of the cam follower 98. A cam track 104 is mounted to the seat bottom frame 38. The bearing 102 is disposed within a cam groove 106 formed in the cam track 104. The cam groove 106 includes upward peaks proximate to the aft position and the fore position for rotating the transverse shaft 74 relative to the carriage 66 and providing the desired tilt for tilting the seat back 34.

Although the seat back tilt is a function of translation of the carriage 66, the invention contemplates that a second DC motor could be provided for permitting user desired tilt adjustment of the seat back 34 for obtaining various recline and upright positions.

Figure 12:
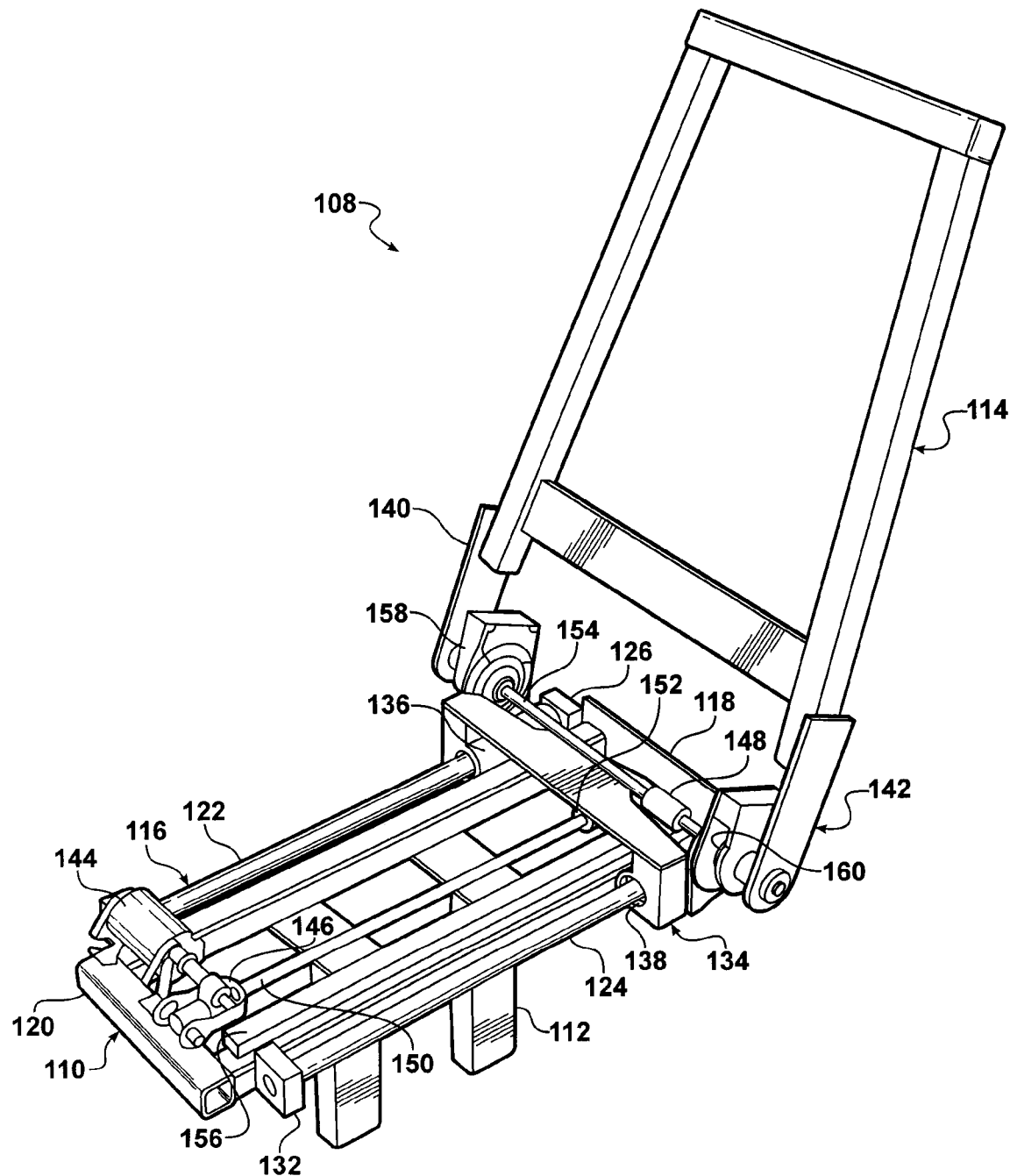
FIG. 12 is a perspective view of a seat assembly in accordance with the present invention, illustrated with seat cushions and trim removed therefrom for revealing interior components of the seat assembly.
Figure 13:
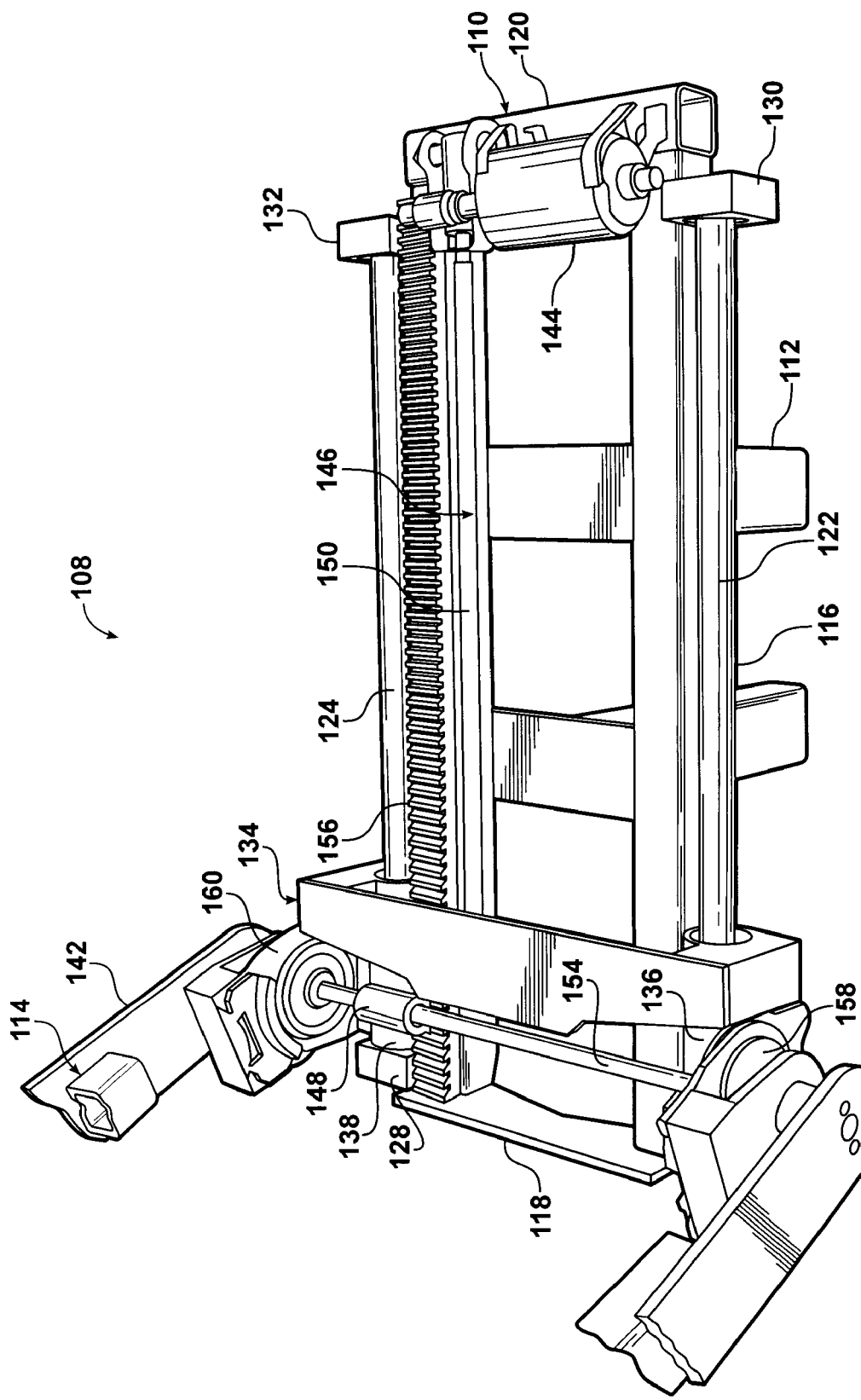
FIG. 13 is an enlarged perspective view of a seat bottom of the seat assembly of FIG. 12.

Referring now to FIGS. 12 and 13, another seat assembly 108 is illustrated in accordance with the present invention. The seat assembly 108 includes a seat bottom frame 110, which is mounted within a passenger compartment of a vehicle upon a pedestal 112. A seat back frame 114 is illustrated mounted to the seat bottom frame 110 for translation relative to the seat bottom frame 110 for providing multiple seating orientations upon the seat bottom of the seat assembly 108.

A linear track 116 is mounted to the seat bottom frame 110 and aligned longitudinally for translation of the seat back frame 114 between a rearward end 118 and a forward end 120 of the seat bottom frame 110. The track 116 includes a pair of linear guide shafts 122, 124 that are mounted to the seat bottom frame 110 by a series of guide shaft mounting blocks 126, 128, 130, 132. A carriage 134 is mounted to the track 116 for linear translation. The carriage 134 includes a pair of linear slide bearings 136, 138 for receiving one of the guide shafts 122, 124 therethrough for providing bearing support to the carriage 134 as it translates along the guide shafts 122, 124.

The seat back frame 114 includes a pair of seat back brackets 140, 142 that are mounted to the carriage 134. The seat back brackets 140, 142 are pivotally mounted to the carriage 134 to pivot relative to the seat bottom frame 110.

The seat bottom frame 110 includes a motor 144 mounted thereto. The motor 144 drives a transmission 146 for translating the carriage 134 and imparting a reduced rotation to an output pinion gear 148. The motor 144 may be a DC motor and the transmission 146 reduces the rotation of the motor 144 to provide a steady and gradual translation of the carriage 134.

The motor 140 imparts rotation to an output shaft 150, which is bearingly supported upon the seat bottom frame 110 at the rearward end 118 and the forward end 120. Due to a reduction gear arrangement between the motor 140 and the output shaft 150, a reduced rate of rotation is imparted upon the shaft 150.

The shaft 150 is threaded and drives a fixed nut 152 mounted to the carriage 134 as illustrated in FIG. 12. Thus, the motor 144 drives the threaded shaft 150 for translating the fixed nut 152 and the carriage 134 along the track 116.

The transmission 146 indirectly adjusts a tilt orientation of the seat back frame 114. A transverse shaft 154 is provided on the carriage 134. The pinion gear 148 is mounted on the transverse shaft 154. The pinion gear 148 engages a gear rack 156 that is mounted to the seat bottom frame 110. As the carriage 134 is translated along the track 116, the pinion gear 148 is translated relative to the gear rack 156. Due to the geared engagement of the pinion gear 148 and the gear rack 156, the pinion gear 148 rotates as it is translated relative to the gear rack 156.

The invention contemplates that various transmissions may be utilized, including a direct motor drive, or an offset chain or gear-type drive. For example, the rotary output shaft 150 may be splined rather than threaded. Rather than a fixed nut 152, a gearbox may be provided on the carriage 134 in geared engagement with the transverse shaft 154. Since the carriage 134 translates relative to the output shaft 150, the shaft 150 may be splined along its length to maintain gearing engagement with the gearbox 152. The gearbox 152 is in geared engagement with the transverse shaft 154 for imparting a further reduced rotation to the transverse shaft 154. The pinion gear 148 is provided on the transverse shaft 154 and driven thereby. Thus, the reduced rotation imparted to the pinion gear 148 drives the pinion gear 148 and consequently the carriage 134 along the gear rack 156.

A pair of harmonic gear drives 158, 160 are mounted to the carriage 134. The harmonic gear drives 158, 160 are coupled to distal ends of the transverse shaft 154 and driven thereby. The harmonic gear drives 158, 160 are also coupled to the seat back brackets 140, 142 for driving the seat back brackets 140, 142. Thus, an even further reduced rotation is imparted from the transverse shaft 154 to the seat brackets 140, 142 to gradually pivot the seat back frame 114 relative to the seat bottom frame 110 as the seat back frame 114 is translated along the track 116. Thus, the harmonic gear drives 158, 160 provide a secondary transmission for adjusting the tilt orientation as a function of translation.

In order to impart a rotary translation to the transverse shaft 154, the shaft 150 may drive the carriage 134 along the track 116. Due to the geared engagement of the transverse shaft 154 with the gear rack 156 through the pinion gear 148, a rotary translation may be imparted to the pinion gear 148 as it is translated relative to the gear rack 156 for rotating the transverse shaft 154 and thereby driving the harmonic gear drives 158, 160 for reduced rotation of the tilt of the seat back frame 114.

Alternatively, if a gearbox 152 is provided for directly driving the transverse shaft 154, then the motor 144 directly drives translation of the carriage 134 and tilt orientation adjustment of the seat back frame 114. Thus, a single drive source may translate the seat back frame 114 and adjust the tilt of the seat back frame 114. The drive source could be a manually driven knob to omit the requirement of the motor 144. The seat back frame 114 could include a conventional manual pivot adjustment so that the user could provide fine adjustment to the tilt orientation of the seat back frame 114.

Figure 14:
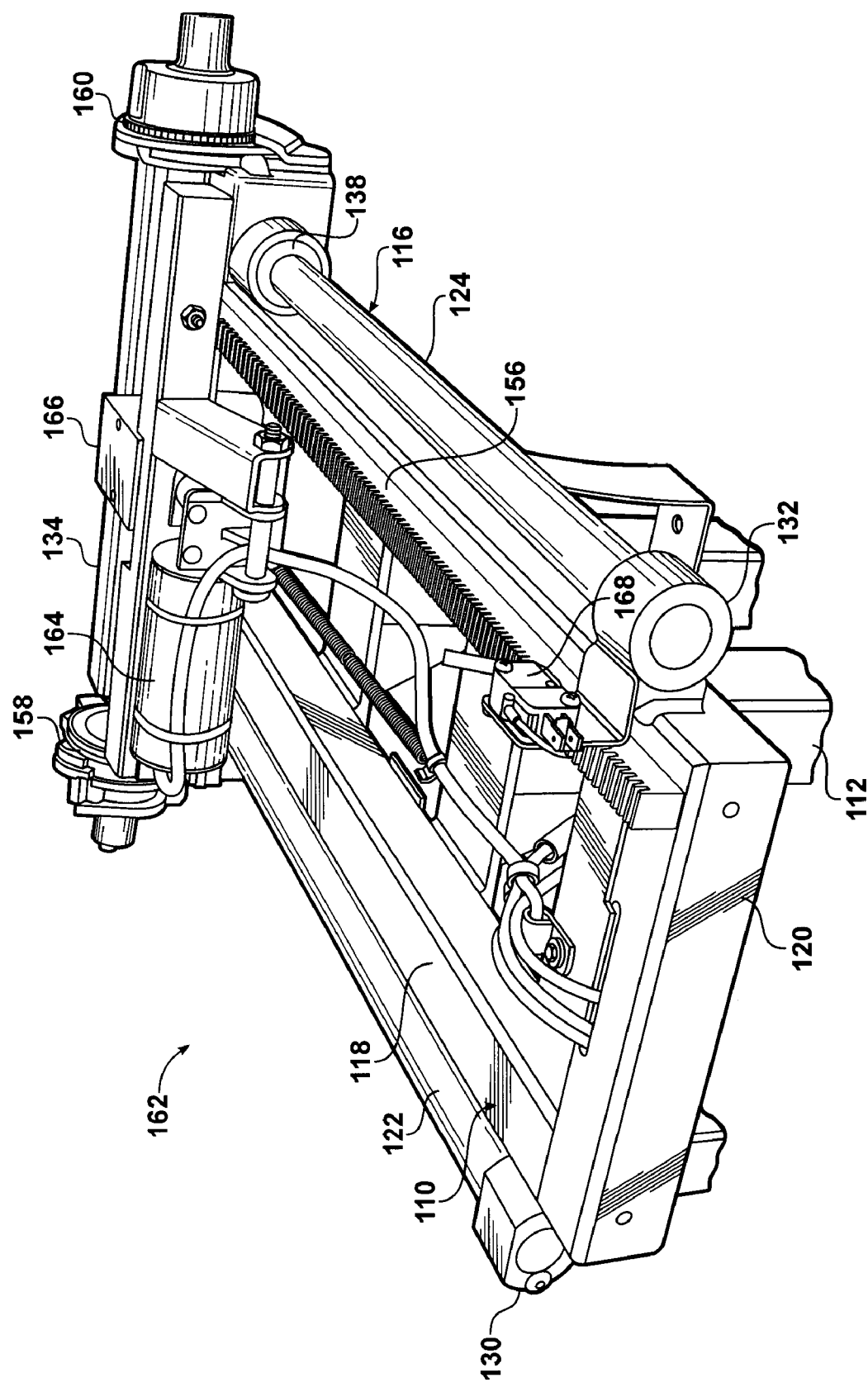
FIG. 14 is a perspective view of a seat bottom of a seat assembly in accordance with the present invention, the seat bottom is illustrated with a seat cushion and trim removed to reveal the components of the seat bottom.
Figure 15:
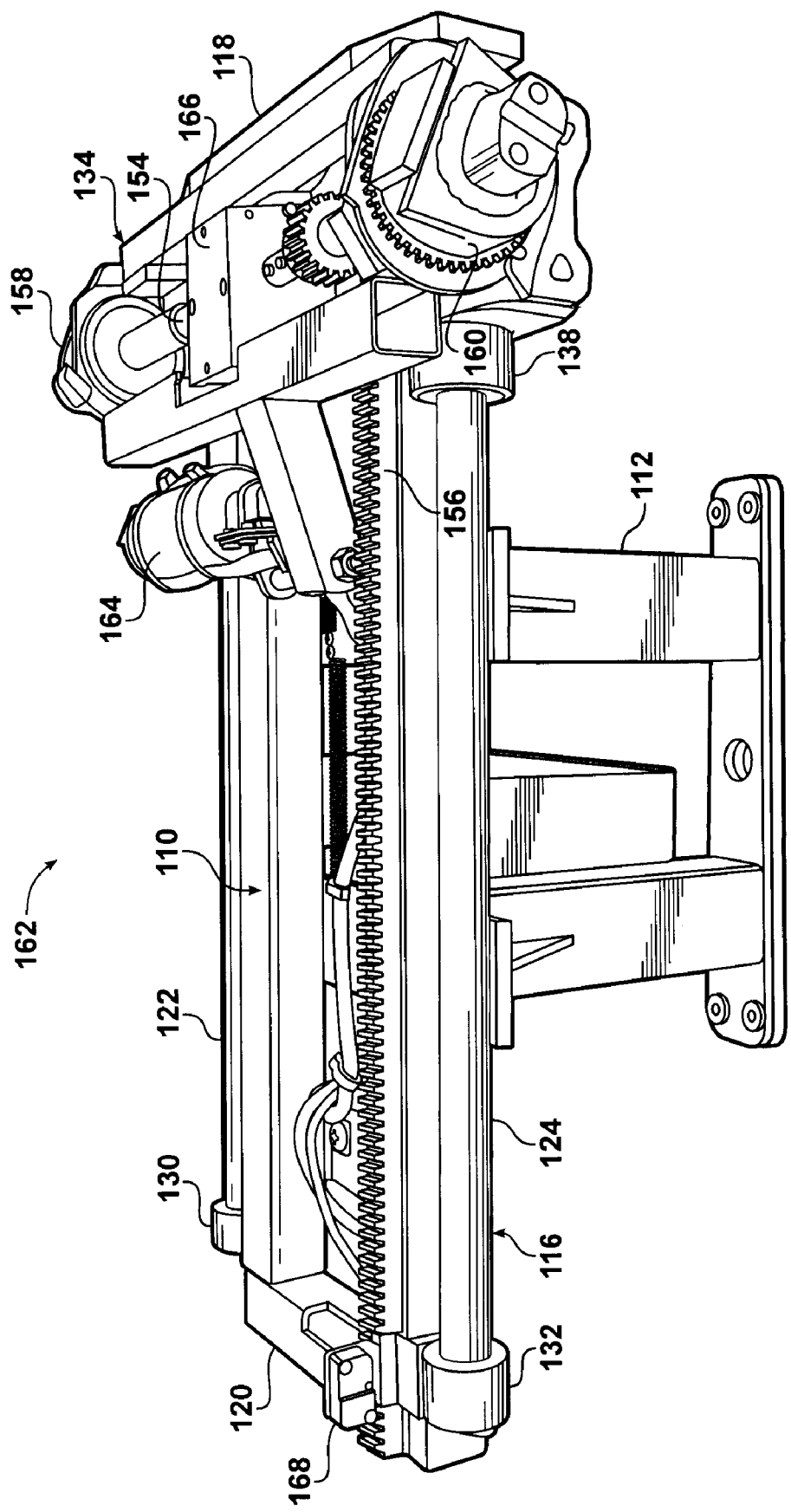
FIG. 15 is another perspective view of the seat bottom of FIG. 14.

With reference now to FIGS. 14 and 15, another seat assembly 162 is illustrated in accordance with the present invention. The seat assembly 162 is similar to the prior embodiment and therefore similar elements retain same or similar reference numerals. Unlike the prior embodiment, the seat assembly 162 includes a motor 164 mounted to the carriage 134. The motor 164 drives a gearbox 166, which imparts a reduced rotation to the transverse shaft 144. The reduced rotation to the transverse shaft 144 results in gradual translation of the carriage 134 along the track 116, as driven by the pinion gear 148 in engagement with the gear rack 156. The rotation of the transverse shaft 154 is further reduced by the harmonic gear drives 158, 160 for gradually tilting the seat back frame 114 relative to the seat bottom frame.

As discussed above with prior embodiments, limit switches 168 are provided for detecting a limit in translation of the carriage 134.

By providing the motor 164 upon the carriage 134, the output shaft 150 of the prior embodiment seat assembly 108 can be omitted. The motor 164 may be utilized for directly driving the translation of the seat back frame 114 and for adjusting the tilt orientation of the seat back frame 114.

Figure 16:
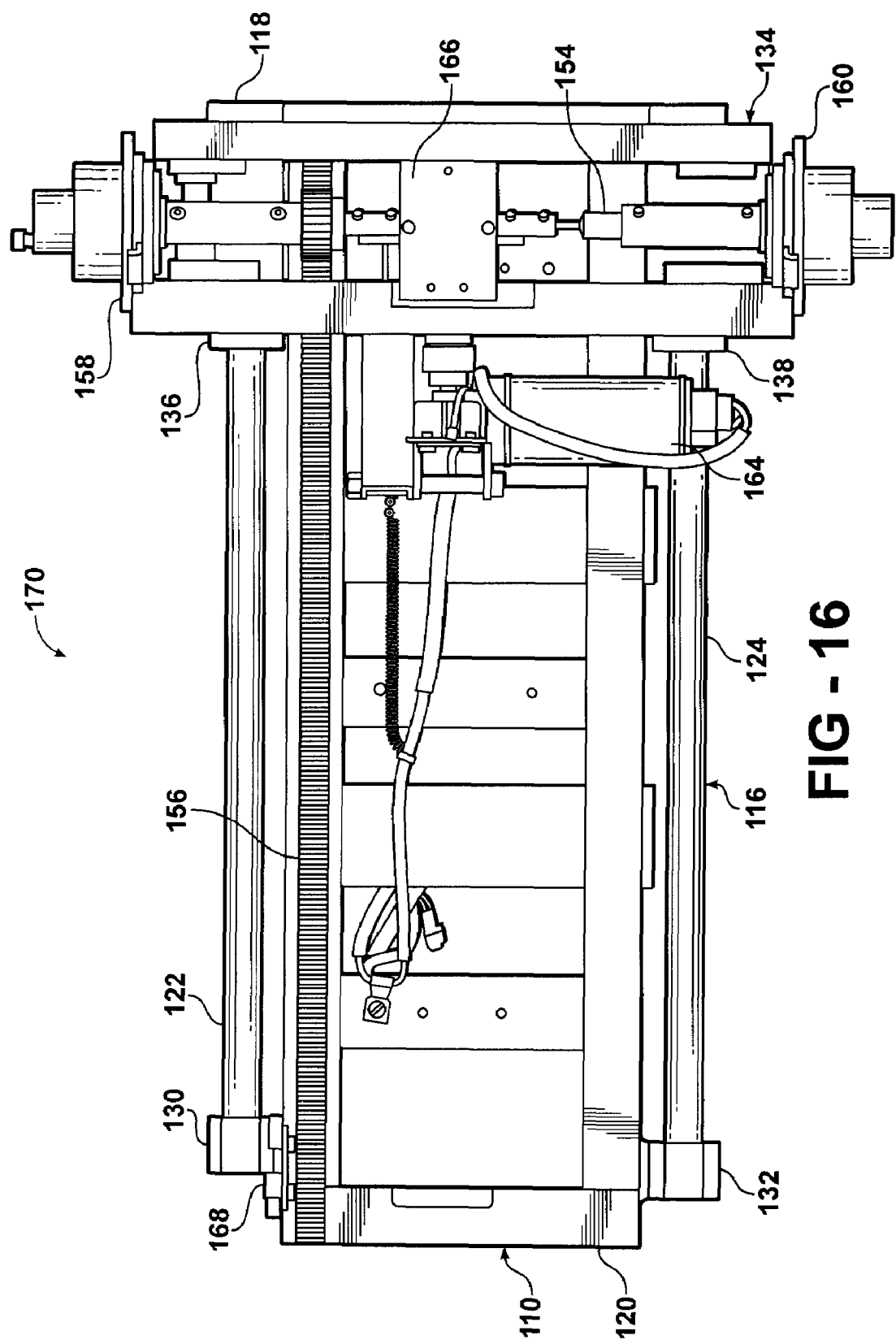
FIG. 16 is a top plan view of another seat bottom for a seat assembly in accordance with the present invention, the seat

Referring now to FIG. 16, another seat assembly 170 is illustrated in accordance with the present invention. The seat assembly 170 is identical to the seat assembly 162 of the prior embodiment, however is a mirror image thereof. Thus, the seat back translation and adjustment of the present invention may be provided in identical seat assemblies, or in seat assemblies that are mirror images of one another for symmetrical utilization within a passenger compartment of a motor vehicle.

In summary, a seat assembly is disclosed which provides a forward seating position and a rearward seating position by translating the seat back from an aft position to a fore position and pivoting the seat back to a corresponding tilt angle for each position. Thus, the passenger may be provided with multiple seating positions by a press of a button, without requiring manual actuation for rotating, collapsing, flipping or performing other manual tasks for utilizing a common seat assembly in multiple positions.

While embodiments of the invention have been described in detail, those familiar with the art to which this invention relates will recognize various alternative designs and embodiments for practicing the invention as defined by the following claims.

What is claimed:

1. A seat assembly for a passenger vehicle comprising:
   a seat bottom frame adapted to be mounted to a floor of a passenger vehicle, the frame having a forward end and a rearward end;
   a seat bottom cushion mounted to the seat bottom frame for receiving a passenger thereon;
   a track mounted to the seat bottom frame extending generally from the forward end to the rearward end;
   a carriage operably mounted to the track for translation along the track;
   a seat back mounted to the carriage for translation with the carriage between a fore position and an aft position for providing at least two seating positions upon the seat assembly;
   a motor mounted to one of the seat bottom frame or the carriage; and
   a transmission driven by the motor and operably engaged to the seat bottom frame and the carriage for driving the carriage along the track to the fore and aft positions, the transmission being operably engaged to the seat back for adjusting a tilt orientation of the seat back relative to the seat bottom frame.

2. The seat assembly of claim 1 wherein the transmission further comprises a harmonic gear mechanism for adjusting the tilt orientation of the seat back relative to the seat bottom frame.

3. The seat assembly of claim 1 further comprising a harmonic gear mechanism mounted to the carriage in operable communication with the transmission and the seat back for adjusting the tilt orientation of the seat back relative to the seat bottom frame.

4. The seat assembly of claim 1 wherein the tilt orientation of the seat back is adjusted as a function of carriage position.

5. The seat assembly of claim 1 further comprising a pair of brackets extending from the seat back to opposed lateral sides of the seat bottom frame and pivotally connected to the carriage.

6. The seat assembly of claim 5 further comprising a harmonic gear mechanism mounted to the carriage in operable communication with the transmission and one of the pair of seat back brackets for adjusting the tilt orientation of the seat back relative to the seat bottom frame.

7. The seat assembly of claim 5 further comprising a transverse shaft pivotally mounted to the carriage, wherein each of the pair of brackets is affixed to a distal end of the transverse shaft.

8. The seat assembly of claim 7 further comprising a pair of harmonic gear mechanisms each mounted to one of the transverse shaft distal ends in operable communication with the transmission and one of the pair of seat back brackets for adjusting the tilt orientation of the seat back relative to the seat bottom frame.

9. A seat assembly for a passenger vehicle comprising:
a seat bottom frame adapted to be mounted to a floor of a passenger vehicle, the frame having a forward end and a rearward end;
a seat bottom cushion mounted to the seat bottom frame for receiving a passenger thereon;
a track mounted to the seat bottom frame extending generally from the forward end to the rearward end;
a carriage operably mounted to the track for translation along the track;
a harmonic gear mechanism mounted to the carriage;
a seat back mounted to the carriage in operable engagement with the harmonic gear mechanism for translation with the carriage between a fore position and an aft position for providing at least two seating positions upon the seat assembly; and
a transmission operably engaged to the seat bottom frame and the carriage whereby upon receipt of a rotary input, the transmission drives the carriage along the track to the fore and aft positions, the transmission being operably engaged to the harmonic gear mechanism for adjusting a tilt orientation of the seat back relative to the seat bottom frame.

10. The seat assembly of claim 9 wherein the tilt orientation of the seat back is adjusted as a function of carriage position.

11. The seat assembly of claim 9 wherein the transmission further comprises:
a longitudinal gear rack mounted on the seat bottom frame; and
a pinion gear in geared engagement with the longitudinal rack so that rotation of the pinion gear drives the carriage along the track.

12. The seat assembly of claim 9 wherein the transmission further comprises:
a longitudinal gear rack mounted on the seat bottom frame; and
a pinion gear pivotally mounted to the carriage in geared engagement with the longitudinal rack so that translation of the carriage imparts rotation to the pinion gear.

13. The seat assembly of claim 12 wherein the pinion gear adjusts the tilt orientation of the seat back.

14. The seat assembly of claim 9 further comprising a motor mounted to one of the seat bottom frame and the carriage, operably engaged to the transmission for driving the transmission.

15. The seat assembly of claim 14 wherein the motor is mounted to the carriage.

16. The seat assembly of claim 14 wherein the motor is mounted to the seat bottom frame.

17. The seat assembly of claim 16 further comprising a motor output shaft driven by the motor in operable communication with the transmission for driving the transmission.

18. The seat assembly of claim 17 wherein the motor output shaft is splined so that the transmission can translate relative to the motor.

19. The seat assembly of claim 17 wherein the motor output shaft is in threaded engagement with the carriage for translating the carriage along the track.

20. A seat assembly for a passenger vehicle comprising:
a seat bottom frame adapted to be mounted to a floor of a passenger vehicle, the frame having a forward end and a rearward end;
a seat bottom cushion mounted to the seat bottom frame for receiving a passenger thereon;
a track mounted to the seat bottom frame extending generally from the forward end to the rearward end;
a carriage operably mounted to the track for translation along the track;
a motor mounted to the carriage;
a transverse shaft mounted to the carriage in geared engagement with the motor and driven thereby;
a longitudinal gear rack mounted on the seat bottom frame;
a pinion gear mounted to the transverse shaft in geared engagement with the longitudinal rack so that the motor imparts a reduced rotation to the pinion gear thereby driving the carriage along the track;
a harmonic gear mechanism mounted to the transverse shaft; and
a seat back mounted to the carriage for translation with the carriage between a fore position and an aft position for providing at least two seating positions upon the seat assembly, the seat back being in operable engagement with the harmonic gear mechanism for imparting a reduced rotation to the seat back as the transverse shaft is rotated.

* * * * *